May 1, 1956     C. H. O. BERG     2,743,814
PROCESS AND APPARATUS FOR THE ELUTRIATION OF SOLIDS
Filed Jan. 7, 1950     2 Sheets-Sheet 1
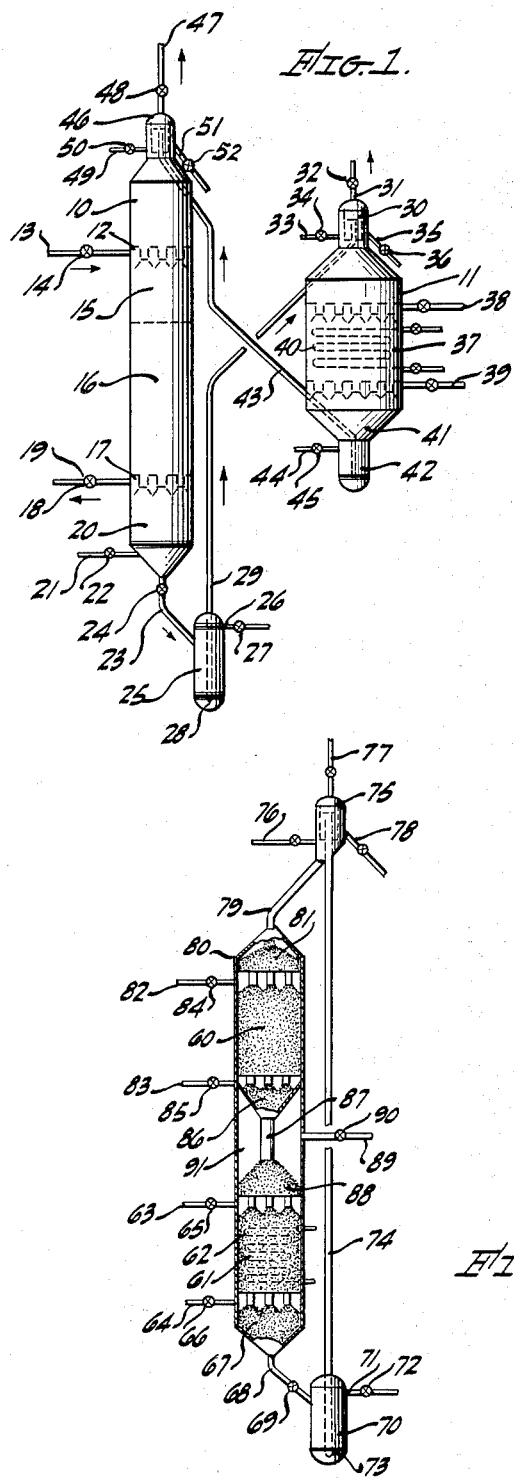
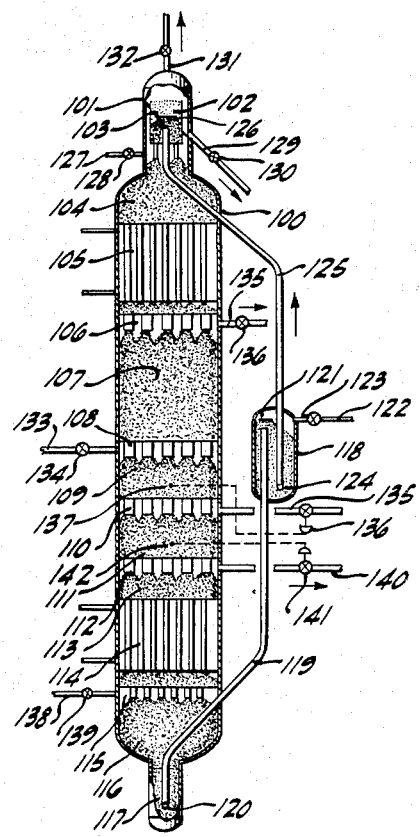
INVENTOR.
CLYDE H. O. BERG,
BY
AGENT.

May 1, 1956 — C. H. O. BERG — 2,743,814
PROCESS AND APPARATUS FOR THE ELUTRIATION OF SOLIDS
Filed Jan. 7, 1950 — 2 Sheets-Sheet 2
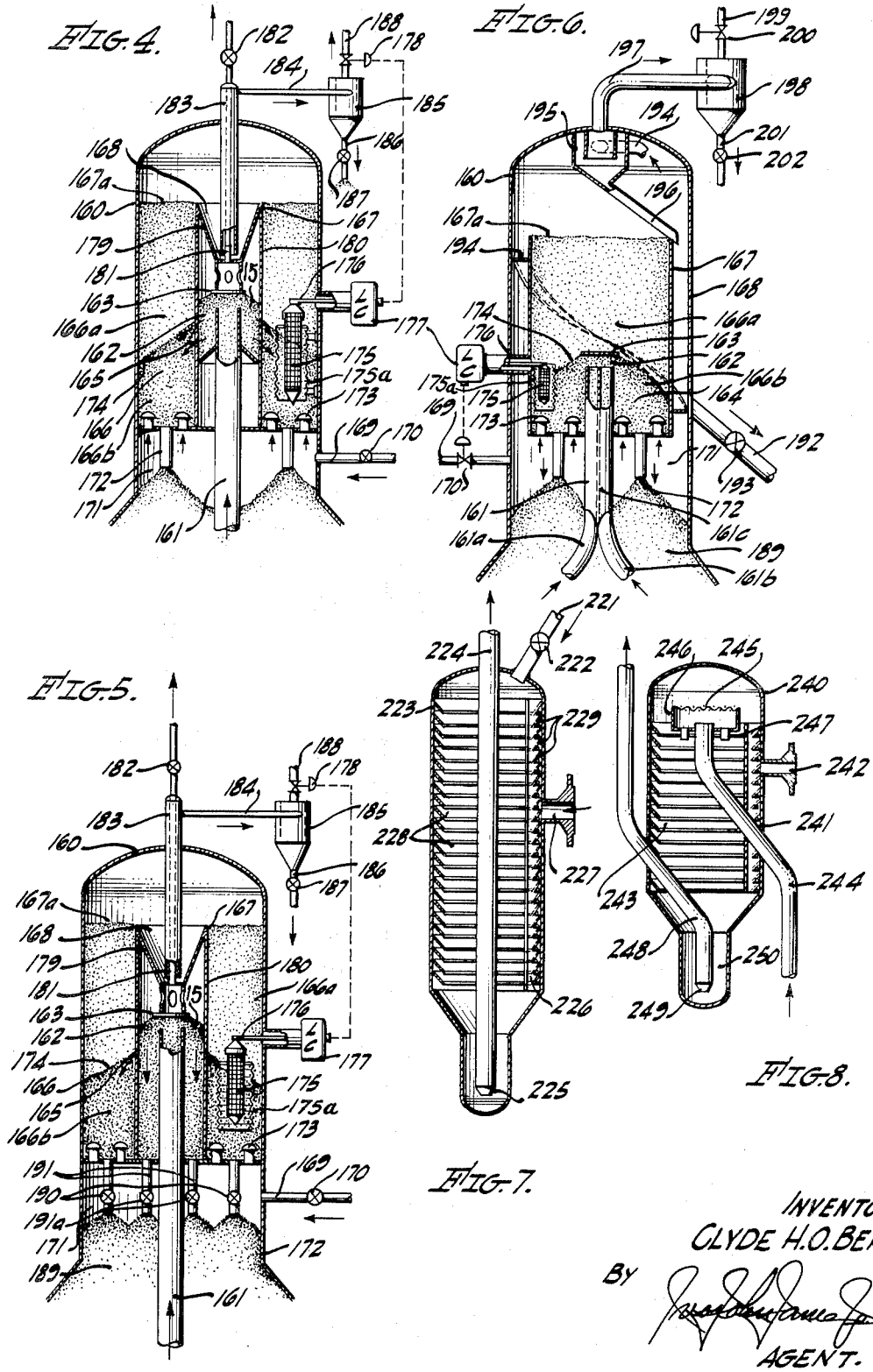
INVENTOR.
CLYDE H. O. BERG,
BY
AGENT.

United States Patent Office

2,743,814
Patented May 1, 1956

2,743,814

PROCESS AND APPARATUS FOR THE ELUTRIATION OF SOLIDS

Clyde H. O. Berg, Long Beach, Calif., assignor to Union Oil Company of California, Los Angeles, Calif., a corporation of California Application January 7, 1950, Serial No. 137,406

20 Claims. (Cl. 209—132)

This invention relates broadly to an improved method and apparatus for the conveyance of granular solids and relates specifically to an improvement whereby solid fines may be continuously removed from the moving mass of solids under conditions of accurate control as to the size of particles removed and to the minimum size of solid particles remaining in the moving stream.

A considerable number of processes now involve the continuous movement, circulation and recirculation of large quantities of granular solids of varying degrees of fineness at high rates, some approaching 1,000 tons per hour. Among the examples of such operations are included the fluid catalytic cracking and other fluidized solids processes, those processes involving moving beds of granular solids including those in which the solids are relatively noncatalytic such as the various thermal coking and cracking operations as well as those in which the solids are catalytic as in the Thermofor Catalytic Cracking (T. C. C.) process, continuous catalytic reforming processes, catalytic desulfurization processes and continuous gas separation processes involving selective adsorption of gaseous constituents on a granular adsorbent.

In all of these processes relatively large quantities of granular solids are passed through treating vessels and recirculated at relatively large flow rates. Invariably, due to abrasion and attrition and perhaps impact of one solid particle against another, the solid particles are slowly reduced in size with the formation of solid fines. These are often undesirable in the process since they exert a detrimental effect upon fluid-solids contact operations. Perhaps the most well known detrimental effect attributed to the presence of solids fines in fluid-solids contact operations is that of channelling. The fines tend to accumulate in the interstices between the solid particles thereby increasing the fluid pressure drop through that part of the mass of granular solids. The flowing fluid naturally will follow the course of least resistance which is that where the pressure drop is the least and usually where the concentration of the solids fines in the mass of solid particles is the least. The results of such channelling are well known, the foremost of course being poor contact of fluid with the solids and this means in catalytic processes poor utilization of the catalytic ingredient, ineffective conversion of treatment by the catalyst as part of the fluids pass through and low quality products.

Fines also exert a serious effect upon catalyst regenerations in which channelling through a mass of moving catalyst or other granular solids being regenerated causes incomplete regeneration of a certain proportion of the solids. Such partial regeneration is reflected in decreased conversion in the reaction part of the process.

It is therefore a primary object of this invention to provide in processes which involve the continuous movement of solid granular particles an improvement whereby solids fines may be continuously and controllably removed from the system to minimize or eliminate the above identified detriments.

It is an additional object of this invention to provide an improved process for the conveyance of granular solids which permits a continuous control over the particle size of the smallest particles remaining in the moving system.

An additional object of this invention is to provide a process for the continuous elutriation of the circulating stream of solids utilized in continuous cyclic fluid-solids contact processes.

Another object of this invention is to provide an improved process for solids conveyance in which the solids are moved in substantially compact form at substantially their static bulk density concurrently with a depressuring lift fluid, either liquid or gaseous, through a lift line or conduit at the end of which the solids are discharged into an expanded bed of solids wherein solids fines of controllable size are continuously elutriated from the mass of large particles.

An additional object of the present invention is to provide an apparatus for the continuous conveyance and elutriation of granular solid particles and to accomplish the other aforementioned objects.

Other objects and advantages of this invention will become apparent to those skilled in the art as the description thereof proceeds.

In this specification, reference to granular solids as being in "substantially compact form" is meant to denote a bulk density of the solids under the prevailing conditions which is substantially equal to the static bulk density of the solids when unaerated and at rest.

Briefly, the present invention comprises an improved process for the conveyance of granular solids in which the solids are moved through a conduit concurrently with a depressuring lift gas under controlled conditions of operation under which the bulk density of the granular solids thus conveyed is substantially the same as the static or at-rest bulk density. The solids are thus conveyed to the end of the conduit at which point a compressive force is applied to the solids issuing from the lift line whereby the solids are maintained in substantially compact form during conveyance. The solids are subsequently contacted with an elutriation gas at such a rate and at such a lineal velocity that a relatively small and controllable change in the bulk density of the solids is effected forming an "expanded bed" of solids. The discharging granular solid particles pass through this expanded bed of solids which is maintained at an average bulk density somewhat less than the static bulk density. The degree of expansion of the bed of solids is controlled between relatively narrow limits which have been found to cause a classification of the solid particles according to size and in which the larger particles gravitate to the lower regions of the expanded bed and the solids fines accumulate at the top. All, or only a portion, of the solids discharging from the lift line may thus be elutriated depending upon the allowable quantity of solids fines present and the rate at which they are formed. The solids fines are continuously withdrawn at a controlled rate from the top of the expanded bed zone while the elutriated fines-free solids are discharged from the bottom of the expanded bed or elutriation zone for recirculation or delivery to a particular operation.

The apparatus involved in effecting the briefly described invention includes an induction zone into which the unelutriated solids are passed, a lift line or lift conduit opening into the induction zone and terminating inside the induction zone at a point adjacent the bottom thereof, means for introducing a lift fluid under pressure into the induction zone, a combination separator and elutriator zone into which the opposite extremity of the lift line opens, means for restricting the discharge opening of the lift line to maintain the solids therein in substantially compact form, means for flowing the granular solids from the separator zone to the elutriation zone, means for passing an elutriation fluid upwardly through the solids maintained in the elutriation zone, means for continuously withdrawing solids fines separated from the upper part of an expanded bed of solids maintained in the elutriation zone, and means for discharging elutriated fines-free granular solids from the elutriation zone.

The process and apparatus of the present invention briefly described above will be more clearly understood from the following description of the accompanying drawings showing the various parts of the conveyance and elutriation apparatus of this invention as well as illustrating the use of the present invention in typical recirculating or moving bed processes involving granular solids.

Referring now more particularly to the drawings:

Figure 1 shows the conveyance process and apparatus of the present invention used in conjunction with a moving bed contact process in which separate regeneration and reaction vessels are employed, Figure 2 shows the conveyance method and apparatus of this invention in the circulation of granular solids through a moving bed contact process in which a single vessel is used containing all the treating zones, Figure 3 shows a continuous selective adsorption column in which the conveyance means of the present invention is employed for solids recirculation and fines control, Figure 4 shows an elevation view in cross section of the separator and elutriation apparatus in which all the solids delivered are elutriated, Figure 5 shows an elevation view in cross section of the separator and elutriation zones in which a variable proportion of the solids delivered is elutriated, Figure 6 shows an elevation view in cross section of the combination separator and elutriation zones in which the solids fines are withdrawn in a manner somewhat different than that shown in Figures 4 and 5, Foigure 7 shows an elevation view in cross section of the induction zone by means of which the granular solids are introduced into the lift line, and Figure 8 shows an elevation view in cross section of an intermediate pressuring vessel which may be disposed along the length of the lift line for the relay of granular solids therethrough.

Referring now more particularly to Figure 1, an apparatus is schematically shown provided with reaction vessel 10 and regeneration vessel 11 and which is typical of compact moving bed operations such as the T. C. C. process and others. Regenerated solids pass down from the top of vessel 10 through fluid engaging zone 12 into which, in concurrent flow operation, feed stock is passed via line 13 controlled by valve 14. If liquid feed is employed, vaporization zone 15 is provided whereby the feed is vaporized in contact with the heated solids. In reaction zone 16 the feed, usually a vapor, contacts the solid material effecting the desired reactions to form spent and usually coke-laden solids as well as a product vapor. The product vapor is separated from the solids in disengaging zone 17 and is removed therefrom via line 18 at a rate controlled by valve 19. The spent solids pass through bottom zone 20 of the column countercurrent to a stripping or sealing gas which is introduced when needed via line 21 controlled by valve 22. The spent stripped solids subsequently pass through transfer line 23 controlled by valve 24 into solids induction zone 25.

In the particular type of conveyance means shown in Figure 1, the operation is intermittent, induction zone 25 being first filled with spent solids with valve 24 open. Subsequently with valve 24 closed lift gas via line 26 controlled by valve 27 is introduced into induction zone 25 thereby conveying the solids therein through opening 28 into lift line 29. In this manner the solids from vessel 10 are conveyed into regeneration vessel 11.

In the top of regeneration vessel 11 is disposed separator and elutriation chamber 30 into which the solids from line 29 are introduced. These zones will be subsequently described in greater detail but suffice it to say that the lift gas accompanying the solids is removed therefrom via line 31 at a rate controlled by valve 32, the elutriation gas for separating the fines from the solids is introduced via line 33 at a rate controlled by valve 34 and the fines are removed via line 35 at a rate controlled by valve 36. The spent elutriated solids subsequently flow into regeneration zone 37 where they contact regeneration gases introduced and removed via lines 38 and 39 in either countercurrent or concurrent flow. Coil 40 is provided within regeneration zone 37 to remove the exothermic heat of regeneration and to limit the temperature of the solids to avoid deactivating the catalyst.

The regenerated solids flow through bottom zone 41 into regenerated solids induction zone 42 wherefrom the solids are conveyed via lift line 43 in substantially compact form concurrently with lift gas passing from regeneration zone 37 or being separately introduced via line 44 controlled by valve 45. The lift gas is removed via line 47 controlled by valve 48, elutriation gas is introduced via line 49 controlled by valve 50 and the fines thus separated are removed via line 51 controlled by valve 52. The elutriated regenerated solids are then passed into the main body of reactor vessel 10 for recirculation.

It will be noted that induction zone 42 is substantially different from induction zone 25, the latter being separated from the vessel. However, it is to be understood that either type of induction zone may be used in either of the positions shown. Induction zone 42 is of the type which is most favored when solids are to be conveyed from a high pressure zone to a lower pressure zone. Induction zone 25 is of the type which is preferred when the solids are to be conveyed from a low pressure zone to a higher pressure zone.

The regenerated solids from regeneration vessel are subjected to further elutriation in separator and elutriation zone 46. It is to be understood that usually, however, a single elutriation and separation zone is sufficient to control the quantity of fines in the system.

Referring now to Figure 2 a recirculation of solids is shown through a single vessel but which contains two isolated contacting zones typified in industry by the small scale catalytic cracking apparatus in which the regenerator and the reactor are in the same vessel. The regenerator may be either in the top or the bottom part of the vessel. In Figure 2, however, the upper zone 60 will be described as the reaction zone while zone 61 will be described as the regenerator provided with cooling coil 62. The regenerator is provided with inlets and outlets 63 and 64 controlled by valves 65 and 66 by means of which concurrent or countercurrent flow of the regeneration gases through the solids may be employed. The regenerated solids pass through bottom zone 67 through transfer line 68 controlled by valve 69 into induction zone 70. A lift gas under pressure, such as flue gas, air, steam, or the like, is introduced thereinto via line 71 controlled by valve 72. In order to convey the catalyst or solids, valve 69 is closed and the lift gas flows through lift line entrance opening 73 and up through lift line 74 into separator and elutriation zone 75 described more in detail below. Elutriation gas as before is introduced via line 76. The lift gas, separated from the solids, is removed via line 77. The separated fines are removed via line 78 from elutriation zone 75. The elutriated fines-free solids then pass via line 79 into the upper part of column 80. From storage zone 81 they pass into reaction zone 60 in which a concurrent or countercurrent contact with the feed stock is effected via lines 82 and 83 properly connected and controlled by valves 84 and 85, respectively.

The spent solids or catalyst flow from reaction zone 60 through sealing or stripping zone 86 in which residual traces of feed stock are stripped from the solids and then flow through sealing leg 87 into hopper 88 above the regeneration zone. A combination sealing and/or stripping gas may be introduced via line 89 controlled by valve 90 into sealing zone 91 for the purpose of preventing the admixture of the regeneration gas and the feed or product gases.

Referring now to Figure 3, a vertical cross section of a selective adsorption column is shown through which a downwardly moving bed of solid granular adsorbent is recirculated via the lift line and conveyance method of this invention. Selective adsorption column 100 is provided at successively lower levels therein with separator and elutriation section 101 containing elutriation zone 102 and separator zone 103, hopper section 104, cooling section 105, lean gas or overhead product disengaging section 106, adsorption section 107, feed gas engaging section 108, primary rectification section 109, intermediate product disengaging section 110, secondary rectification section 111, bottoms product or rich gas disengaging section 112, preferential desorption section 113, adsorbent heating section 114, stripping gas engaging section 115, bottom section 116 and adsorbent induction section 117. Induction section 117 is connected with intermediate pressuring vessel 118 via lower lift line 119 provided with entrance opening 120. The solids are conveyed concurrently with a depressuring lift gas through lower lift line 119 from the pressure in induction zone 117 into intermediate pressuring vessel 118 against thrust plate 121, the lift gas being withdrawn via line 122 controlled by valve 123. The lift gas may comprise part of the stripping gas introduced into the bottom of column 100 or a separate lift gas. Upon filling vessel 118, lift gas is introduced thereinto via line 122 controlled by valve 123 raising the pressure above that existing in either induction zone 117 or separator zone 103 and thus conveying the solids through opening 124 into upper lift line 125 into separator zone 103 against thrust plate 126. By alternately raising and lowering the pressure within intermediate pressuring vessel 118 an intermittent flow of solids from induction zone 117 through lift lines 119 and 125 into separator zone 103 may be effected. For a completely continuous conveyance of the adsorbent the lower and upper lift lines and intermediate pressuring vessel are provided in duplicate or triplicate and operate in sequence. In order to reduce the quantity of lift gas flowing, openings 120 and 124 may be restricted to between 0.1 and 0.5 of the cross sectional area of the lift line. The same is true of the lines shown in Figures 1 and 2.

Elutriation gas is introduced via line 127 at a rate controlled by valve 128 to elutriate the solids fines from the adsorbent delivered into separator zone 103. A partial expansion of the bed, lowering the bulk density of the mass of solids somewhat, is effected causing the fine solids to separate at the top from which they are withdrawn via line 129 controlled by valve 130. The elutriation gas and lift gas together are removed via line 131 at a rate controlled by valve 132 from the top of the column and subjected to centrifugal separation for the finest fine solids, if desired. The granular solid adsorbent thus conveyed passes from elutriation zone 101 into adsorption column 100 for repassage through the aforementioned sections by gravity.

Solids accumulating in hopper 104 pass subsequently by gravity through cooling zone 105 wherein they are indirectly cooled to a temperature of about 100° F. for most gas separations. This cooling is accomplished indirectly by cooling water and in the presence of a countercurrent flow of a portion of the overhead or lean gas product through the solids for the purpose of desorbing residual traces of adsorbed stripping gas used at the bottom of the column.

This adsorbent subsequently passes into adsorption zone 107 wherein it is countercurrently contacted with the feed gas to be separated introduced via line 133 at a rate controlled by valve 134. The less readily adsorbable constituents remain substantially unadsorbed and pass up through the adsorption zone 107 and are removed therefrom via line 135 controlled by valve 136 as a lean gas or overhead product. The more readily adsorbable constituents are adsorbed forming a rich adsorbent together with small quantities of the less readily adsorbable constituents.

The rich adsorbent thus formed subsequently flows into primary rectification zone 109 wherein it is countercurrently contacted with and adsorbs a reflux gas containing constituents of intermediate adsorbability thereby sharply increasing the temperature of the adsorbent and preferentially desorbing the less readily adsorbable constituents from the adsorbent forming an enriched adsorbent. The thus desorbed constituents pass upwardly into the adsorption zone and become part of the overhead gas product.

The enriched adsorbent in secondary rectification zone 111 is subseqently contacted with and adsorbs a portion of the rich gas or bottoms product as reflux again sharply increasing the temperature of the adsorbent and preferentially desorbing the aforementioned constituents of intermediate adsorbability. The intermediate constituents thus desorbed are partly removed from intermediate product disengaging zone 110 via line 135 controlled by valve 136 at a rate in accordance with the position of the aforementioned sharp temperature gradient in primary rectification zone 109 as detected by thermocouple point 137. The remaining portion of the intermediate constituents pass as reflux into primary rectification zone 109 as previously described.

The rectified adsorbent formed in secondary rectification zone 111 passes into preferential desorption zone 113 wherein it is contacted with and adsorbs a preferentially adsorbable stripping gas such as steam. This gas is introduced into stripping gas engaging zone 115 via line 138 at a rate controlled by valve 139 and passes subsequently upwardly through adsorbent heating zone 114. Most of this stripping gas is preferentially adsorbed by the adsorbent in preferential desorption zone 113 thereby desorbing the most readily adsorbable constituents of the feed gas adsorbed on the rectified adsorbent. A portion of the thus desorbed constituents pass into secondary rectification zone 111 as reflux while the remainder is removed along with unadsorbed quantities of stripping gas via line 140 at a rate controlled by valve 141 in accordance with the position of the aforementioned sharp temperature increase or temperature break indicated by thermocouple 142 in secondary rectification zone 111.

The partially stripped adsorbent formed in preferential desorption zone 113 passes downwardly through the tubes of heating zone 114 in direct contact with the aforementioned stripping gas during which passage the adsorbent is indirectly heated to temperatures of the order of 400° F. to 600° F. and remaining traces of adsorbed constituents are stripped. The stripped adsorbent passes into bottom zone 116 and subsequently into induction zone 117 for conveyance to the top of the column as previously described.

The adsorbents may be any of the well known gas adsorbents such as activated charcoal, silica gel, activated aluminum oxide, or the like. The lift gas may be either a portion of the stripping gas such as steam or other gases suitably isolated by means of sealing sections so as to prevent undesired contamination of the gas streams employed in the main body of the process.

Referring now more particularly to Figures 4, 5 and 6, elevation views in cross section of three modifications of the separator and elutriator section of the apparatus according to the present invention are shown. In these three drawings similar parts are designated with the same numbers. Although the combined separator and elutriator sections may be employed in a separate vessel and provided with a transfer line for conducting the elutriated solids therefrom to the contacting vessel or other delivery point involved as shown in Figure 2, in Figures 4, 5 and 6 the combined separator and elutriator sections are shown in vessel or housing 160 which is indicated as an extension of a larger vessel as those shown in Figures 1 and 3. Figures 4, 5 and 6 are described together in so far as their similarity extends. Their unique features will subsequently be described separately.

The solids are conveyed in compact form as above described by means of a concurrent flow of depressuring lift gas through lift line 161 into separator zone 162 within inner section 180 and which is provided with thrust plate 163 which provides the restriction to the solids flow from the outlet of the lift lines referred to above. A substantially compact mass of granular solids 15 formed in separator zones 162 of Figures 4 and 5, but in Figure 6 the substantially compact solids from the lift line 161 are discharged to form a mass of solids 164 through which the elutriating gas passes and in which the bulk density of the solids may be decreased slightly. In Figures 4 and 5 the solids flow through apertures 165 from separator zone 162 into elutriator zone 166. The lower portion of zone 166 is occupied by a slightly expanded bed of granular solids and the upper portion of which is occupied by an aerated fluidized mass of fine solid particles. An interface 174 is manifest below which the fine particles remain in a state of hindered settling. As the fines accumulate level 167a tends to rise and the fines flow over the upper edge 167 of inner section 180 into fines accumulation zone 168 through which no elutriation gas passes thus allowing the fines to settle. The means with which fines are removed from the apparatus may vary somewhat, the schemes shown in Figures 4 and 5 being substantially the same in which the fines are removed as a suspension and in Figure 6 the fines are removed as a settled solids phase. These will be subsequently described.

Elutriation gas is introduced via line 169 at a rate controlled by valve 170 into the open space 171 between downcomer tubes 172 below the lower portion. These tubes are filled with a substantially compact mass of granular solids and an up-flow of elutriation gas therethrough is prevented. Elutriation gas risers 173 are provided whereby the elutriation gas is introduced directly into the bottom of elutriation zone 166. The gas in rising through the more dense phase of solids in elutriation zone 166 effects a small controllable degree of expansion of the solids mass whereby a classification of solids results in order to separate the fine solids and leaves those in the desired mesh size range in the bottom part of the elutriation zone.

The solids are discharged from the lift line into the elutriation zone at an intermediate point between the levels at which the fines and fines-free solids are withdrawn. That part of the elutriation zone below the introduction point may be termed the exhausting section for here the smaller particles are gradually elutriated from the mass of larger particles. The part above the solids introduction point may be termed the enriching zone for here the relatively large particles elutriated from the mass of solids in the exhausting zone are separated from the aerated fines and are returned to the exhausting zone. There appears to be an active and continuous transfer of solids in directions which ultimately leads to a condition of complete classification when the degree of bed expansion is maintained within certain limits by control of the elutriation gas velocity. The unelutriated solids are introduced into the central portion of the elutriation zone while fines are withdrawn from the top of the enriching zone and fines-free elutriated solids from the bottom of the exhausting zone.

In elutriation zone 166 there are established two individual phases, an upper phase in enriching zone 166a consisting of a relatively dense aerated suspension of solid fines and a lower nonaerated mass of elutriating solids of the desired mesh size range in exhausting zone 166b. Under these conditions of operation previously described, an interface 174 is established between the exhausting and enriching zones, the position of which is employed to control the elutriation operation by controlling the rate of flow of elutriation gas. This level control consists of movable grid 175 surrounded by stationary grid 175a which eliminates wall effects, both grids extending through solids interface 174. The frictional and gravitational forces of the solids surrounding movable grid 175 change as the interface 174 rises or falls or as the bulk density of the upper or lower phases change which effects a change in the total downward force supported by torsion tube 176. This force is caused to actuate level controller 177 which in turn actuates a control valve which regulates the rate of flow of elutriation gas through elutriation zone 166. In Figures 4 and 5 this valve is valve 178 controlling the rate at which elutriation gas is removed from elutriation zone 166, and in Figure 6 it is valve 170 controlling the rate of elutriation gas introduction.

Referring now more particularly to Figures 4 and 5, inner section 180 is provided with a conical settling chamber 168 in which the fines accumulate after passing over the top of the wier at the top. This consists of funnel shaped member 179 disposed within and at the top of cylindrical section 180. It is within cylindrical section 180 that separator section 162 is disposed. Lift line 161 enters separator zone 162 and is concentric within cylindrical section 180. Lift gas accumulates below settling basin 179 and above thrust plate 163 from which it is removed via line 181 controlled by valve 182. The elutriation gas passing upwardly through elutriation zone 166 reverses its direction and flows downwardly through funnel shaped member 179 increasing in velocity as it approaches the lower annular opening of line 183. The elutriation gas therefore is disengaged from the fluidized mass of solids fines at interface 167a at a low velocity and subsequently resuspends the supported fines within funnel member 179 at high velocity thereby reforming a suspension of fines which is removed from the system via lines 183 and 184 and introduced into cyclone separator 185. Separated fines are removed from the cyclone via line 186 controlled by valve 187 and the fines-free elutriation gas is removed via line 188 controlled by valve 178 to be recirculated by means not shown if desired.

In Figure 4 the entire quantity of solids discharged from lift line 161 into separator zone 162 flows through apertures 165 and is introduced therethrough into the central portion of elutriation zone 161. Thus the entire quantity of the delivered solids is subjected to elutriation.

In Figure 5 a variable portion of the solids introduced into separator zone 162 flows directly downwardly through downcomer tubes 191 controlled by valves 191a without elutriation into the main body 189 of solids. The remaining portion of solids flows through elutriation zone 166 and is elutriated of fines and then passes through downcomer tubes 172 into the main body of solids 189. In these instances it is possible to employ the entire quantity of lift gas as the elutriation gas in which case the gas removed via line 181 is conducted via line 169 into open space zone 171. This type of operation is particularly desirable when the rate of fines formation is very low and thus the elutriation of only a small proportion of the total solids conveyed or circulated is sufficient to maintain the concentration of solids fines to a sufficiently low value at which no detrimental effects are experienced.

Referring now more particularly to Figure 6, it will be noted that the main distinguishing feature between this and the modifications shown in Figures 4 and 5 is that the fines spilling over wier 167 accumulate in settling basin 168 through which no elutriation gas passes and are removed therefrom via line 192 at a rate controlled by valve 193 as an unsuspended stream of solids fines. The apparatus shown in Figure 6 is simple in construction and consists of inner section 167, the upper portion of which forms a wier, and the bottom surface in which elutriation gas risers 173 and solids downcomers 172 are disposed and through which lift line 161 extends. Preferably this is a cylindrical section and is disposed concentrically within vessel extension 160. The annular space thus formed between section 160 and 167 is provided with sloping baffle 194 having a slope sufficient in the direction of fines flow to cause a substantially complete transfer of separated solids from the annular space to the outlet line 192. The division between separator zone 162 and elutriation zone 166 is less distinct, the solids being introduced directly from beneath thrust plate 163 into the space in which elutriation occurs. The entire quantity of solids thus introduced is elutriated as above described and fines-free solids are delivered to the main body of solids 189 in the vessel below.

Lift line 161 is different in that solids are delivered through a plurality of lines 161a and 161b thereinto and division 161c is provided. In this manner a plurality (any number of lift lines may be used) of lines provide a continuous flow of solids into the elutriation zone. It is to be understood that such a modification may be incorporated in the other modifications of elutriation chambers shown as well as in the intermediate pressuring vessel shown in Figure 8.

The elutriation gases disengaged from the fluidized fines via interface 167 pass via line 194 through internal cyclone 195. Here further quantities of suspended fines are separated and conducted via line 196 into annular space 168 where the other fines accumulate or line 196 may return such solids to the aerated mass of fines in enriching zone 166a. The fines-free elutriation and lift gas are subsequently removed from the top of vessel 160 via line 197 and further treated if necessary in cyclone separator 198 from which the gas is removed via line 199 controlled by valve 200 and the last traces of fines separated are removed via line 201 controlled by valve 202.

Referring now to Figure 7, an elevation view of an induction zone similar to those zones 25 and 70 employed in Figures 1 and 2 is shown. The induction zone in Figure 7 is disposed at the lower end of the lift line and serves to introduce solids thereinto. Line 221 controlled by valve 222 serves to introduce granular solids into induction chamber 223. Lift line 224 extends downwardly through induction chamber 223 terminating at the lower extremity thereof as restricted opening 225. A longitudinal header 226 open at its upper and lower extremity is disposed along one side of induction zone 223 and is provided with lift gas inlet 227. Around the inside surface of induction chamber 223 is disposed a series of baffles 228 which slope downwardly and inwardly toward the vertical axis of the chamber. Each of these baffles is provided with an opening 229 into header 226. Lift gas introduced via line 227 passes throughout the length of header 226 and is introduced uniformly into the mass of solid material contained within induction chamber 223. The use of such baffles minimizes the lift gas pressure drop existing between the lift gas inlet 227 and lift line opening 225. Header 226 may comprise one-half of a tube welded longitudinally along the inside of induction chamber 223.

The operation of the induction chamber shown in Figure 7 is intermittent, no lift gas being introduced while valve 222 is open and the solids are entering. When the chamber is full of solids, valve 222 is closed and the lift gas pressure is increased by the introduction of lift gas through opening 227 which causes the flow of solids from chamber 223 through opening 225 into and through lift line 224.

Referring now more particularly to Figure 8, an elevation view in cross section of an intermediate pressuring vessel such as that described and shown as vessel 118 in Figure 3 is given. The intermediate pressuring vessel consists of vessel 240 provided with longitudinal lift gas header 241 provided with lift gas inlet line 242. A series of downwardly inwardly sloping baffles 243 is provided for the distribution of the entering lift gas and the collection of the leaving seal gas. Header 241 is open at its upper and lower ends.

Solids are introduced by means of a concurrently depressuring lift gas through lower lift line 244, and are thrust against thrust plate 245 consisting in this modification of a three-quarter-inch wire mesh adjacent the upper opening of the lift line. The lift gas disengages from the solids thus delivered and is removed via line 242. The solids subsequently pass from tray 246 via tubes 247 into the main body of solids in the vessel.

Solids are removed via upper lift line 248, which terminates adjacent the lower extremity of intermediate pressuring vessel 240 in opening 249, by pressuring up vessel 240 with lift gas via line 242.

In operation the gas pressure within intermediate pressuring vessel 240 is alternatively raised and lowered above and below the main operating pressure of the vessel or vessels through which the solids are circulated. When the vessel is depressured due to a removal of gas via line 242 a seal gas passes downwardly through upper lift line 248 while the concurrent flow of solids is prevented since the velocity of this seal gas in passing through annular space 250 between the lower walls of the depressured intermediate pressuring vessel 240 and the lower part of upper lift line 248 is insufficient to lift the solids. At the same time a concurrent flow of lift gas upwardly through lower lift line 244 conveys solids therewith and introduces them into vessel 240 until the vessel is substantially full. Subsequently by pressuring the depressured vessel a seal gas flows downwardly through lower lift line 244 while the downward flow of solids is prevented similarly. An upward flow of lift gas through upper lift line 248 removes solids from the annular space 250 and thereby empties the vessel. By connecting lower lift line 244 to the bottom of a vessel and upper lift line 248 to the top of a vessel in a similar manner as illustrated in Figure 3 the continuous pressuring and depressuring of vessel 240 as described effects an intermittent flow of granular solids from the bottom to the top of the vessel through which the solids are desired to be passed. For a continuous flow at least two such pressuring vessels are required each of which have an upper and a lower lift line.

In another modification of elutriation apparatus, not shown, the elutriation vessel is provided intermediate its ends with a transverse horizontal divider forming a separator zone above and an elutriation zone below. The lift line or lines extend into separator zone and a thrust plate is provided adjacent the discharge opening as shown in Figures 4, 5, and 6. A nonexpanded mass of solids forms in the separator zone wherein the lift gas and solids are separated. A lift gas downcomer tube is provided extending through the transverse divider as well as through a lower inclined baffle traversing the elutriation zone. These downcomer tubes carry at least part of the separated lift gas from the separator zone into the zone below. An outlet tube, generally controlled by a back pressure regulator, is provided to remove any remaining lift gas. Solids pass through tubes depending from the transverse divider and flow thereby from the separator zone into the elutriation zone which extends through the inclined baffle. The elutriation gas comprises the lift gas conducted through the downcomer from the separator zone plus any additional elutriation gas which may be added as required. Where the elutriation apparatus is situated in the top of a treating vessel such as in selective absorption, a process gas therefrom may be at least partly utilized as elutriation gas. A valve and line are provided to either remove excess process gas or introduce additional elutriation gas from or into said elutriation zone. The elutriation gas causes the formation of an "expanded bed" of solids in the elutriation zone and the accumulation of a fluidized suspension of separated fines adjacent the expanded bed as shown and described in Figures 4, 5, and 6. The fines are drawn off via a line and control valve from the part of the elutriation zone above the inclined baffle while the elutriation gas is introduced into the elutriation zone from below this baffle. A valve and line are provided for withdrawing elutriation gas from that part of the elutriation vessel above the inclined baffle. The rate of elutriation gas flow is controlled by the degree of bed expansion whereby a movable grid as shown in Figures 4, 5, and 6 detects changes in the bulk density of the expanded bed and varies the flow rate of elutriation gas accordingly to maintain a predetermined degree of expansion or a predetermined bulk density in the elutriation zone.

It is important that the elutriating mass of solids in the elutriation zone be contacted with an elutriation gas at such a rate below that necessary to cause true "aeration" or suspension in which all the granular solid particles are in a state of turbulent and hindered setting. The separated fines collect above the elutriating solids and form an aerated suspension of fines which is removed from the system. The elutriating solids are not suspended in the elutriating gas, but the rate of gas flow is controlled to such a velocity that an "expanded bed" of elutriating solids is formed, that is, the bulk density of the elutriating solids is reduced somewhat but not sufficiently to effect fluidization. In nearly all cases a decrease of less than about 40% of the static bulk density is sufficient to obtain efficient elutriation of the fines from the expanded mass of solids and usually an expansion of between 1% and 25% is adequate. However, the actual degree of expansion chosen is determined by the size of particles it is desired to elutriate and higher velocities and degrees of expansion are required to separate the larger fines.

The actual elutriation gas velocities are not specifically mentioned since these vary so widely with pressure, temperature, gas viscosity, solids size and density. The desired degree of elutriation may be obtained, however, by regulating the elutriation gas velocity to effect the stated degree of bed expansion and controlling the velocity to elutriate the undesired fines from the expanded bed of solids.

The following examples are cited as illustrative of the diverse applications of the method and apparatus of the present invention.

EXAMPLE I

The hydroforming process, a catalytic reforming operation, is efficiently carried out with the production of high yields of toluene in the presence of a granular catalyst consisting of about 10% molybdenum oxide ($MoO_3$) on a carrier containing 95% alumina and 5% silica. The catalyst was in the form of 0.25 inch pills having an average bulk density of about 58 pounds per cubic foot and the apparatus in which the process was carried out was provided with a reaction vessel and a regeneration vessel similar to that shown in Figure 1. The feed was introduced into the reaction zone in contact with regenerated catalyst at a temperature of 1050° F. and in the presence of 5,000 cubic feet of hydrogen recirculated per barrel of feed. In this case the feed stock was a naphthenic gasoline having a boiling range of from 200° F. to 260° F. The space velocity in a plurality of runs was kept between 0.5 and 1.0 volume of feed per volume of catalyst. The average reaction temperature in these runs was 945° F., although a range as wide as from 850° F. to 1050° F. may be used, and the reacted product was removed as a vapor at a temperature of 870° F. from the reaction zone. In the bottom of the reaction zone the spent catalyst was purged of hydrocarbon constituents by a countercurrent flow of steam which also was employed as a lift gas. The spent purged catalyst was conveyed in compact form by depressuring steam through the lift line from the bottom of the reaction vessel to an elutriation zone disposed in the upper portion of the regeneration vessel. Steam was used as the elutriation gas, passing through the mass of spent catalyst in the elutriation zone at a velocity which was varied between 3 and 5 feet per second thereby expanding the bed of spent solids in the elutriation zone and effecting a decrease in the bulk density of the solids of between 5% and 8%. The elutriation gas thus used established an aerated suspension of catalyst fines having a mesh size of about 15 and higher above the expanded bed of solids. These fines were continuously withdrawn from the elutriation zone in the manner shown in Figure 6 by allowing them to settle in a quiescent portion of the elutriation zone. The quantities of fines thus withdrawn corresponded to 0.0002% per cycle of the circulating granular catalyst. The fines concentration in the circulating catalyst was thus maintained to less than 2% by weight and no channelling problems were encountered.

The spent elutriated catalyst was passed from the elutriation zone into the regeneration zone wherein it was contacted with a recirculating stream with oxygen-containing regeneration gas containing a high proportion of flue gas constituents. Regeneration temperature was maintained below a maximum of 1050° F. The regenerated catalyst was then passed from the regeneration zone to a reduction zone wherein it was contacted with a gas rich in hydrogen and following the reduction is passed directly to the reaction zone. The pressure of this operation was from 150 to 160 pounds per square inch gauge and pressure drops employed across the lift lines averaged 40 pounds per square inch although the hydroforming operation may be carried out at pressures between the levels of 50 to as high as 2,000 pounds per square inch. The lifting medium employed was 200 pound steam.

EXAMPLE II

The continuous desulfurization of 850° F. end point coker distillate analyzing 1.97% sulfur was obtained in the manner of the present invention in which a series of granular catalysts comprising 2% to 3% cobalt oxide and from 8% to 12% molybdenum oxide supported on a 95% alumina-5% silica catalyst was used. The catalyst granules used in this desulfurization process were 3/16 inch pills and the apparatus in which the process was carried out was similar to that shown in Figure 1. The pressure of the desulfurization step was maintained at 1100 pounds per square inch gauge at an average reaction temperature of 810° F. Five thousand cubic feet of hydrogen per barrel of feed were recycled through the reactor and a space velocity of 1.0 volume of feed per volume of catalyst was used. The spent catalyst from this operation contained about 6% to 7% carbonaceous material and was conveyed in the presence of depressuring 1100 pound steam during which conveyance steam was superheated to an average temperature of 790° F. Regeneration was accomplished in the presence of recirculating flue gas into which a small stream of air was introduced to maintain the temperature of the regeneration below a maximum of 1100° F. The regenerated catalyst was withdrawn from the regeneration zone and conveyed in compact form through a tubular lift line in the presence of depressuring lift gas to an elutriation zone wherein an elutriation gas was passed upwardly through the regenerated catalyst particles at velocities ranging between 4 and 7 feet per second thereby effecting a 7–10% decrease in the bulk density and forming an expanded bed of the granular catalyst. The elutriation gas thus employed established an aerated suspension of regenerated catalyst fines having a bulk density of about 15 pounds per cubic foot above the expanded bed of larger catalyst particles. The catalyst fines thus separated were removed as a suspension in the elutriation gas from the elutriation zone similar to the method shown and described in connection with Figure 4. The entire quantity of circulating catalyst was thus elutriated reducing the concentration of fines having an average diameter of less than about 0.1 of an inch to less than 1.7% by weight. In the present process the fines were recovered and reprocessed into 3/16 inch pills. The thus elutriated solids were passed from the bottom of the elutriation zone into reduction zone where they were contacted with a hydrogen-rich gas prior to being introduced into the reaction zone for reuse. The product from the reaction zone contained 0.13% sulfur.

In the present operation, the ratio of time the catalyst spends in the reaction step to the ratio of time spent in regeneration is exceedingly high of the order of 40 to 1, and consequently the reaction zone and the regeneration zone are designed for a residence time in about this ratio. In large installations in which the reaction zone is very big, part of the catalyst removed from the bottom of the reaction zone may be recirculated through the reaction zone and only part of it conveyed to the regeneration zone for burn-off of carbonaceous deposits.

EXAMPLE III

The catalytic cracking of a 400° F. to 760° F. straight run gas oil was carried out in an apparatus similar to that shown in Figure 2 except that the conveyance means employed with this particular apparatus was that using an intermediate pressuring vessel as shown in Figure 3, and the regeneration zone and the reaction zone were disposed in the upper and the lower portions of the column, respectively. This process for catalytic cracking was effected at a pressure of 25 pounds per square inch gauge and at a temperature which averaged 915° F. Pressures from about atmospheric to about 500 pounds per square inch may be used and temperatures in the range of from 800° F. to 1100° F. depending upon the characteristic of the feed stock. The catalyst employed was acid-treated natural clay. The feed-to-catalyst ratio on a volume basis was 0.4. The spent catalyst removed from the reaction zone was contaminated with 3½% carbon and was depressured in substantially compact form from the bottom of the reaction zone at a pressure of 20 pounds per square inch gauge to a vacuum of −10 pounds per square inch gauge in the intermediate pressuring vessels. The pressure differentials existing across the lift lines averaged 30 pounds per square inch and the catalyst was conveyed from the pressuring vessels to the top of the vessel by introducing 50 pounds per square inch steam at half of the cycle and connecting the intermediate pressuring vessels to a jet ejector maintaining a −10 pound per square inch gauge pressure during the other part of the cycle. The spent catalyst was thus conveyed to the elutriation zone in which an expanded bed of spent catalyst was maintained. Normally the catalyst had a static bulk density of 42.9 pounds per cubic foot and comprises 1/8 to 3/16 inch diameter extruded granules. Through the elutriation zone an elutriation gas comprising flue gas was passed forming an expanded bed of granules by effecting a decrease of about 3–5% in the bulk density of the solids. An aerated suspension of catalyst fines including those particles having diameters less than about 0.1 of an inch was also established above the expanded bed. Since in this particular process the rate of fines formation was only about 0.0001% per cycle only about 30% of the circulating stream was elutriated by employing an elutriation chamber similar to that shown in Figure 5. The fines were removed as a suspension in the elutriation gas and discarded. The elutriated catalyst was removed from the elutriation zone, combined with unelutriated catalyst passing directly from the discharge opening of the lift line and was introduced into the regeneration zone wherein the carbonaceous deposit was burned off in the presence of a recirculated flue gas containing injected air controlled to maintain the temperature in the regenerator below 1050° F. The regenerated catalyst subsequently passed through a sealing zone directly into the reaction zone to contact further quantities of gas oil feed. A 37% conversion by volume to gasoline boiling below 400° F. was obtained. The quantity of fines present in the circulating stream of catalyst was held at a value of about 2.1% by weight of the entire mass.

EXAMPLE IV

A gas oil cracking operation was carried out in the presence of a synthetic bead alumina-silica catalyst under the conditions given in Example III and in an apparatus like that shown in Figure 2. Good yields (30%–39%) of gasoline were obtained and it was found that the bead-type catalyst was conveyed as efficiently and with as low attrition losses as the clay type. The synthetic bead catalyst had a mesh size of 4 to 6 and an approximate static bulk density of 40.8 pounds per cubic foot. In the elutriation zone established at the uppermost extremity of the lift line and separated from the process vessel, a flue gas as an elutriation gas was introduced at a sufficient rate to establish a 4–7% decrease in the bulk density of the bead catalyst maintained therein. Above the thus expanded mass of elutriating catalyst granules an aerated suspension of catalyst fines having a bulk density of between 10 and 15 pounds per cubic foot was established. Catalyst fines having a mesh size of 15 and higher were thus suspended and removed with the elutriation gas using an elutriation chamber similar to that shown in Figure 5. Approximately 18% of the circulating stream of catalyst particles was thus elutriated and the concentration of catalyst fines in the circulating mass of solids was maintained at a maximum value of 3.6% by weight. The elutriated solids were subsequently combined with the unelutriated solids and introduced into the reaction zone. In all cases the attrition loss of the catalyst was very significantly less than that experienced with bucket elevators.

EXAMPLE V

Using an apparatus similar to that shown in Figure 2, thermal coking of a residual oil was carried out by recirculating 0.25–0.50 inch granules of coke heated to a temperature of 1050° F. and by introducing the preheated residual oil directly into the reaction zone concurrently with the moving solids. An 85% volume yield of coker distillate based on the residual oil feed was obtained. Of the remaining 15% approximately 6% was burned in the regenerator by contacting with a recirculated flue gas to supply heat to the process. Build-up of coke in the system was prevented by producing a stream of excess coke from the bottom of the column. The lift gas employed in this operation was steam introduced at a pressure of 75 pounds per square inch gauge. An elutriation zone was established at the upper extremity of the lift line and steam at 25 pounds per square inch gauge was employed as the elutriation gas. The elutriation gas velocity of 6–8'/sec. effected a decrease in the bulk density of the coke particles from about 55 pounds per cubic foot to form an expanded bed of solids at a bulk density of about 48 pounds per cubic foot in an elutriation chamber similar to that shown in Figure 6. An aerated suspension of coke fines having a mesh size of about 5 and more was established thereby above the expanded bed and a stream of the thus elutriated fines periodically withdrawn from the elutriation chamber. The lift gas comprised compressed flue gas and an efficient lifting of the coke particles was obtained.

EXAMPLE VI

In an apparatus similar to that shown in Figure 3 the continuous separation by selective adsorption of a gaseous mixture of hydrocarbons on a compact moving bed of activated charcoal was effected. The granular charcoal contained granules having a mesh size of 12 to 25. The column employed to contact the feed gas and the adsorbent was 4.5 feet in diameter and 85 feet in height. A charcoal circulation of 18,000 pounds per hour was circulated through the column to contact 73,900 standard cubic feet per hour of a feed gas having the following composition:

DEMETHANIZER OVERHEAD GAS OR ADSORPTION COLUMN FEED GAS ANALYSIS

Table 1

| Ingredient: | Mol per cent |
|---|---|
| Hydrogen | 39.8 |
| Nitrogen | 1.7 |
| Carbon monoxide | 0.9 |
| Oxygen | 0.1 |
| Methane | 51.3 |
| Carbon dioxide | 0.2 |
| Acetylene | 0.2 |
| Ethylene | 5.8 |
| Ethane | Trace |
| Total | 100.0 |

The carbon dioxide, acetylene, ethylene and ethane constituents of this feed gas were adsorbed on the charcoal, rectified through contact of the rich adsorbent with a reflux gas which comprised a fraction of the rich gas product, and the remaining adsorbed constituents were indirectly heated and stripped by means of steam at a maximum temperature of about 550° F. to produce a rich gas product at a rate of 4475 standard cubic feet per hour having the following composition:

Table 2

RICH GAS PRODUCT ANALYSIS

| Ingredient: | Mol per cent |
|---|---|
| Hydrogen | |
| Nitrogen | |
| Carbon monoxide | |
| Oxygen | 0.1 |
| Methane | |
| Carbon dioxide | 2.9 |
| Acetylene | 3.6 |
| Ethylene | 92.7 |
| Ethane | 0.7 |
| Total | 100.0 |

The unadsorbed constituents of the feed gas pass the adsorption zone and were removed at a rate of 44,825 standard cubic feet per hour as a lean gas product having the following composition:

Table 3

LEAN GAS ANALYSIS

| Ingredient: | Mol per cent |
|---|---|
| Hydrogen | 31.6 |
| Nitrogen | 1.4 |
| Carbon monoxide | 0.8 |
| Oxygen | 0.1 |
| Methane | 66.1 |
| Carbon dioxide | |
| Acetylene | |
| Ethylene | |
| Ethane | |
| Total | 100.0 |

The remaining 24,600 standard cubic feet per hour was passed upwardly through the cooling zone as a purge gas and was removed from below the elutriation zone. This purge gas had the following composition:

Table 4

PURGE GAS ANALYSIS

| Ingredient: | Mol per cent |
|---|---|
| Hydrogen | 61.8 |
| Nitrogen | 2.5 |
| Carbon monoxide | 1.3 |
| Oxygen | 0.2 |
| Methane | 33.7 |
| Carbon dioxide | 1.0 |
| Acetylene | |
| Ethylene | 0.4 |
| Ethane | |
| Total | 100.0 |

The hot stripped charcoal was conveyed using steam as a lift gas to the elutriation zone disposed at the top of the column. The static bulk density of the granular charcoal was 34 pounds per cubic foot. An elutriation gas comprising steam flowing at a velocity of 0.6–0.9 feet per second therethrough expanded the bed of charcoal in the elutriation zone giving it a bulk density of about 28 pounds per cubic foot and establishing an aerated suspension of charcoal fines containing those particles having a mesh size of about 50 and above. The elutriation chamber was of the type shown in Figure 6 from which a stream of unsuspended charcoal fines was removed. The entire quantity of solids passing through the elutriation zone was elutriated thereby maintaining the concentrations of fines having a mesh size of 25 and higher at a value of 1.2% by weight. Other granular adsorbents such as silica gel, activated aluminum oxide, and other gas adsorbents may also be used.

EXAMPLE VII

The conveyance of 7 tons per hour of roughly classified coal having particles ranging from about 0.25" to 1.5" in diameter but containing about 18% of particles below 0.125" was effected in a conveyance apparatus according to this invention. The lift conduit was 6 inches in diameter and 45 feet in height. The lift fluid employed was water introduced at a pressure of 35 pounds per square inch. At the top of the lift line an elutriation chamber which was 14 inches in diameter was established. An expansion of the mass of coal in the elutriation zone reduced its bulk density between about 12 and 20%. The fines concentration was reduced in the coal from 18% to less than 1% by weight.

EXAMPLE VIII

The conveyance apparatus according to this invention was employed to convey 8756 tons per day of dry sand from a bituminous sand retorting process using compressed air at 225 pounds per square inch gauge pressure. The screen analysis of the dry coke-free sand was:

| Mesh: | Weight per cent |
|---|---|
| +20 | Trace |
| −20+35 | 10 |
| −35+60 | 50 |
| −60+80 | 20 |
| −80+200 | 16 |
| −200 | 4 |
| | 100 |

The conveyance line ran horizontally along the surface of the ground for a distance of 1,000 feet. The conduit was 10" in diameter and 2,600 MSCF/D of compressed air was used as a conveyance medium. The sand was discharged into an elutriation chamber through which part of the compressed conveyance medium was passed through the solids, forming an expanded bed of 18% decrease in bulk density whereby 93% by weight of the sand particles passing 200 mesh were removed before the remaining particles were employed in a subsequent process step.

The foregoing examples are not intended as limitations of the process and apparatus of the present invention in which a means is provided for the conveyance of granular solids in substantially compact form and at their static bulk density by means of which the formation of fines due to attrition and/or abrasion is materially reduced from that experienced in conventional conveyors such as bucket elevators and in which such fines that do form are continuously elutriated therefrom in order to maintain the concentration of fines present in any circulating stream of granular solids below a predetermined maximum value.

The foregoing illustrations are intended to be merely descriptive of various applications in which the process and apparatus of the present invention may be utilized and are not intended as limitations thereof.

The process operations and the apparatus described and illustrated according to this invention are applicable to other continuous solids contact or conveyance processes than those illustrated such as those of catalytic desulfurization, the various modifications of the Fischer-Tropsch synthesis, thermal reforming in contact with heated relatively noncatalytic solids, thermal cracking of gases or liquids in contact with such solids, continuous treatment of liquids with adsorbent solids such as clay treating mineral oils, clarification of sugar solutions with bone char, the washing and classification of solids such as coal, and many others. It is further understood that the process and apparatus of this invention may be employed per se in the classification of solids with liquid or gaseous classification fluids. In each of these processes when it is desirable to maintain a low controllable concentration of solids fines in the moving mass of solids treated or to establish a low concentration of fines, the process and apparatus of the present invention may be applied.

It is to be understood that the conveyance chamber or lift conduit described and illustrated herein are not restricted to flow in any particular direction and horizontal, vertical and directions disposed at angles from the vertical do not interfere with the efficiency nor the operability of the lift line described. Thus the conveyance conduit in which granular solids are transferred in compact form at their static bulk density may be used for lifting of solids, the transfer of solids over relatively long horizontal distances or a combination of the two in which a lateral as well as a vertical transfer are simultaneous.

It is to be understood that the conveyance and elutriation fluids described in conjunction with this invention may be either liquid or gaseous. Preferably when the solids are being contacted with a liquid in a contact treating process the solids are conveyed and elutriated by means of liquid conveyance fluids. When a vapor or gas is contacted with a moving mass of solids desirably gaseous fluids are used for conveyance and elutriation. This does not, however, preclude the use of liquid or gaseous conveyance and elutriation fluids with gaseous or liquid contact processes. The use of liquid conveyance media simplifies somewhat the design of construction of the conveyance chamber or lift line conduit since with depressuring liquids the degree of expansion accompanying the depressuring is negligible with liquids and appreciable with gaseous fluids. Thus when a gaseous conveyance fluid is depressured over the pressure drop which is a substantial fraction, i. e., more than about 10% of the absolute operating pressure the lift gas expansion effects are appreciable and steps must be taken to insure the maintenance throughout the lift line of a substantially constant solids flow criterion given by the following equation:

$$\sqrt{\frac{dp}{dl\rho} - g} A^{1.5}$$

in which $$\frac{dp}{dl}$$

is the pressure differential per unit length of lift line, $\rho$ is the bulk density of the solids being transferred, $g$ is the acceleration of gravity and $A$ is the cross sectional area of the lift line at a given point. This criterion may be maintained constant by increasing the cross sectional area $A$ in the direction of flow, by removing a small portion of the lift gas at successive points along the length of the conveyance chamber, or by other means when gaseous expandable conveyance fluids are used. When liquid conveyance fluids are used cylindrical lift lines may be used without consideration for expansion effects. Thus when appreciable high pressure drops exist a given conveyance chamber such as in those cases where the distance over which the solids to be conveyed must be passed is great, the use of liquid conveyance fluids is dictated since a conveyance line of uniform diameter may be employed.

The quantity of conveyance fluid per unit required to convey a unit weight of granular solids is considerably less than that required with the conventional suspension type of conveyors in which the gas is employed to suspend or aerate the solid material. In those types of conveyors between 5 and about 15 standard cubic feet of gas are required for a single pound of granular solids varying somewhat according to size of the solid particles and the density of the particles and the conveyance gas. In the present conveyance apparatus, however, requirements are reduced to between about 0.2 and 1.0 standard cubic feet per pound of solids. Whereas, lift gas velocities of from 10 to 40 feet per second and higher are required with the suspension type of conveyors, lift gas velocities in the present operation may be maintained at between about 0.5 to as high as 10 feet per second with a more preferable range with between about 1 and 4 feet per second. It is highly important to emphasize that the condition of the granular solids while being conveyed through the conveyance chamber or lift line conduit of this apparatus is such that the granular solids exist as a moving mass of substantially compact unaerated granular solids having substantially the same bulk density during conveyance as the static bulk density of the granular solids when aerated and at rest. The solids move in what is termed "plug type flow" through the conveyance chamber and they are not aerated nor suspended in a lift gas.

At the inlet end of conveyance chambers according to this invention introduction of solids thereinto is frequently facilitated by restricting the cross sectional area somewhat to increase the velocity of lift fluid flowing therethrough. The restriction may be as large as about 0.9 of the cross sectional area of the lift line just inside the inlet opening, or it may be as small as about 0.1 of this cross sectional area but preferably when a restricted opening is employed the cross sectional area of the restriction averages between about 15% and 40% of the cross sectional area just inside the entrance opening.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for the conveyance and elutriation of granular solids containing solids fines which comprises submerging the inlet of an elongated conveyance zone with a bed of said solids to be conveyed, passing a conveyance fluid through said bed and through said conveyance zone at a rate sufficient to convey said solids therethrough, applying a force against the solids discharging therefrom thereby maintaining said solids during conveyance in the presence of a concurrent conveyance fluid flow in the form of a moving substantially compact mass of said solids having substantially their at-rest bulk density, flowing at least a portion of the discharging compact mass of granular solids into an elutriation zone at an intermediate point to form and maintain a downwardly moving accumulation of said solids therein below said intermediate point, passing an elutriation fluid upwardly through said accumulation of solids, controlling the elutriation fluid flow rate at a value insufficient to fluidize said solids but sufficient to form and maintain said accumulation of solids as an expanded bed of nonfluidized solids having a bulk density less than said at-rest bulk density of said solids and to establish and maintain a fluidized suspension of solids fines above said intermediate point in said elutriation zone whereby an active classifying transfer of solids exists between said expanded bed and fluidized suspension of fines, removing solids fines from said aerated suspension at the top of said elutriation zone, and separately withdrawing substantially fines-free solids by gravity from the bottom of said elutriation zone.

2. A process according to claim 1 in combination with the step of controlling the elutriation fluid flow through said elutriation zone to maintain said expanded bed of nonfluidized granular solids at a bulk density not more than 40% less than the static bulk density of said solids when at-rest.

3. A process according to claim 1 wherein said solids are conveyed substantially horizontally directly into said intermediate point of said elutriation zone.

4. A process according to claim 1 wherein said granular solids are conveyed upwardly directly into said intermediate point of said elutriation zone.

5. A method for the conveyance and treatment of granular solids containing solids fines which comprises introducing said solids into an induction zone to form and maintain an accumulation therein submerging the inlet of a communicating conveyance zone, introducing a conveyance fluid into said induction zone under pressure above said accumulation whereby said fluid flows therefrom through said conveyance zone at a rate sufficient to convey said solids therethrough, applying a force against the granular solids discharging at the outlet of said conveyance zone to maintain said solids during conveyance as a compact granular mass having a bulk density substantially equal to the static bulk density of said solids when at rest, flowing at least part of the discharging solids into an elutriation zone at an intermediate point therein, passing an elutriation fluid upwardly through said elutriation zone countercurrently to the solids introduced thereto, controlling the flow rate of said elutriation fluid to form and maintain said solids below said intermediate point as an expanded bed of nonfluidized solids having a bulk density between about 75% and about 100% of said static bulk density below said intermediate point and to establish and maintain an aerated suspension of solids fines immediately adjacent said expanded bed and above said intermediate point whereby an active classifying transfer of fines from said expanded bed into said suspension and of larger solid particles from said suspension into said expanded bed occurs, withdrawing solids fines from said aerated suspension, and removing solids of reduced fines content as a moving bed by gravity from the bottom of said elutriation zone.

6. A method according to claim 5 in combination with the step of separating said elutriation fluid from said aerated suspension of fines at a relatively low velocity in the upper portion of said elutriation zone, subsequently recombining said elutriation fluid at a high velocity with said solids fines to form a suspension thereof, and removing said suspension from said elutriation zone.

7. A method according to claim 5 including the steps of separating said elutriation fluid from said aerated suspension of solids fines, removing said elutriation gas from said elutriation zone, passing said aerated suspension from said elutriation zone to a settling zone, and removing therefrom settled solids fines substantially free of elutriation fluid.

8. A method for the elutriation of solids fines from a moving substantially compact mass of granular solids which comprises introducing a stream of granular solids substantially at their static bulk density into an elutriation zone at an intermediate point therein so as to maintain a downwardly moving accumulation of solids below said intermediate point, flowing an elutriation fluid upwardly through said elutriation zone, controlling the rate of elutriation fluid flow at a value insufficient to fluidize said accumulation of solids but sufficient to decrease the bulk density of said solids accumulation from said static bulk density and form and maintain an expanded bed of nonfluidized solids therein below said intermediate point and to form and maintain a fluidized suspension of solids fines immediately adjacent said expanded bed and above said intermediate point thereby effecting an active classifying transfer of solids between said fluidized suspension and said expanded bed, withdrawing solids fines from said aerated suspension, and removing elutriated solids having a reduced solids fines content from the lower part of said elutriation zone.

9. A method according to claim 8 wherein the flow rate of said elutriation fluid passing through said elutriation zone is controlled so as to reduce the bulk density of said solids therein by not more than 25% of the static bulk density thereof.

10. A method according to claim 8 in combination with the steps of detecting the bulk density of said expanded bed by means in contact therewith, and controlling said elutriation fluid flow rate so as to maintain a predetermined bulk density therein.

11. A process for the elutriation of solids fines from a stream of granular solids which comprises introducing a compact stream of granular solids to be elutriated into an intermediate point of an elutriation zone for passage downwardly by gravity from said intermediate point, introducing an elutriation fluid into the bottom of said elutriation zone to pass upwardly countercurrent to the solids therein, controlling the flow rate of said elutriation fluid to form and maintain an expanded bed of downwardly moving nonfluidized solids within said elutriation zone below said intermediate point and to maintain the bulk density of said expanded bed at a value between about 1% and about 25% less than said static bulk density of said solids and to form and maintain a fluidized body of elutriated fines within said elutriation zone above said intermediate point, disengaging said elutriation fluid from said fluidized body of fines at a relatively low velocity, overflowing solids fines from said fluidized body into a settling zone, recombining the settled fines therein with at least part of said disengaged elutriation fluid at a relatively high velocity thereby reforming a suspension of fines in said elutriation fluid, removing said suspension from said settling zone, subsequently separating said fines from said elutriation fluid, and removing elutriated solids of reduced fines content from said elutriation zone.

12. A process for the elutriation of solids fines from a stream of granular solids which comprises introducing said granular solids as a compact stream by means of a conveyance fluid flowing concurrently therewith into a separator zone, applying a force against solids discharging thereinto from the outlet of said conveyance zone to maintain said solids therein at a bulk density substantially equal to the static bulk density of said solids when at rest, disengaging at least part of said conveyance fluid from the solids discharged into said separator zone, withdrawing said conveyance fluid from said separator zone, removing a first part of said solids from said separator zone, flowing the remaining part of discharged solids from said separator zone into an intermediate point of an elutriation zone adjacent thereto for passage downwardly by gravity from said intermediate point, introducing an elutriation fluid into the bottom of said elutriation zone to pass upwardly countercurrent to the solids therein, controlling the flow rate of said elutriation fluid to form and maintain an expanded bed of downwardly moving nonfluidized solids within said elutriation zone below said intermediate point and to maintain the bulk density of said expanded bed at a value between about 1% and about 25% less than said static bulk density of said solids and to form and maintain a fluidized body of elutriated fines within said elutriation zone above said intermediate point, disengaging said elutriation fluid from said fluidized body of fines at a relatively low velocity overflowing solids fines from said fluidized body into a settling zone, recombining the settled fines therein with at least part of said disengaged elutriation fluid at a relatively high velocity thereby reforming a suspension of fines in said elutriation fluid, removing said suspension from said settling zone, subsequently separating said fines from said elutriation fluid, and removing elutriated solids of reduced fines content from said elutriation zone.

13. A process for the elutriation of solids fines from a moving stream of granular solids which comprises introducing said solids as a compact stream through a conveyance zone into an elutriation zone at an intermediate point thereof by means of a concurrent flow of conveyance fluid, applying a force against the solids discharging from the outlet of said conveyance zone to maintain said solids therein at a bulk density substantially equal to the static bulk density of said solids when at rest, passing an elutriation fluid upwardly through the downwardly moving accumulation of discharged solids in said elutriation zone below said intermediate point, controlling the rate of elutriation fluid flow to form and maintain said accumulation of discharged solids as an expanded bed of solids having a bulk density between about 1% and about 25% less than said static bulk density and to form and maintain a fluidized body of solids fines within said elutriation zone above said intermediate point whereby an active classification of solids is established and maintained between said fluidized body and said expanded bed, withdrawing elutriated solids having a reduced solids fines content from said elutriation zone below said expanded bed, disengaging said elutriation fluid at a relatively low velocity from said fluidized body of said solids fines, overflowing solids fines from said fluidized body thereof in said elutriation zone into a settling zone, withdrawing settled solids fines therefrom substantially free of elutriation fluid, flowing the disengaged elutriation fluid through a centrifugal separator zone to separate residual suspended solids fines, flowing the separated solids fines from said centrifugal separator zone into said settling zone, and removing the elutriation fluid from said separator zone.

14. An apparatus for the conveyance of compact granular solids and elutriation of solids fines therefrom which comprises an induction chamber, inlet means for introducing and maintaining an accumulation of solids therein, inlet means for introducing a conveyance fluid under pressure thereinto at a point above said level therein, a conveyance conduit communicating with said induction chamber below said solids level, an elutriator chamber communicating at an intermediate point thereof with the outlet of said conveyance conduit, means for applying a force against solids discharging from said outlet thereby maintaining solids being conveyed through said conveyance conduit substantially at the normal static at-rest bulk density of the solids, inlet means for an elutriation fluid opening into the lower extremity of said elutriation chamber to pass countercurrently to the solids therethrough, means for controlling the flow rate of said elutriation fluid to produce and maintain an expanded bed of nonfluidized solids below said intermediate point and a fluidized suspension of solids fines above said intermediate point, a settling chamber communicating with the upper part of said elutriator chamber and adapted to receive solids fines elutriated from said granular solids discharged into said elutriation chamber, outlet means for solids fines from the bottom of said settling chamber, and outlet means for elutriated solids having a reduced fines content opening from the lower part of said elutriator chamber.

15. An apparatus according to claim 14 in combination with a movable grid disposed within said elutriation chamber and in contact with said expanded bed of solids maintained therein and responsive to changes in bulk density thereof, and a controller instrument means responsive to movements of said grid and adapted to vary the flow rate of said elutriation fluid to maintain said expanded bed and said fluidized suspension.

16. An apparatus according to claim 14 in combination with a separator chamber surrounding the outlet opening of said conveyance conduit and communicating with said intermediate point of said elutriation chamber and thereby adapted to flow at least part of solids discharged thereinto from said conveyance conduit directly into said elutriation chamber for elutriation, outlet means for conveyance fluid opening from said separator chamber, and outlet conduit means for the remaining part of said solids opening directly from said separator chamber.

17. An apparatus for the elutriation of solids fines from a moving stream of granular solids which comprises an elutriation vessel, a conduit for solids to be elutriated opening at an intermediate point within said elutriation vessel, inlet means for an elutriation fluid opening at the bottom of said elutriation chamber, an adjustable fluid flow control means for controlling the elutriation fluid flow rate to maintain an expanded bed of nonfluidized solids having a bulk density less than the static bulk density of said solids when at rest in the lower part of said elutriation chamber and to establish and maintain a fluidized suspension of solids fines above said intermediate point, a movable vertically extended grid within said elutriation chamber and disposed in contact with said expanded bed of solids therein and responsive to changes in the bulk density thereof, a controller instrument means responsive to the movements of said movable grid and adapted to vary said fluid flow control means to maintain a predetermined degree of expansion of said expanded solids bed, outlet means for elutriated solids opening from the bottom of said elutriation chamber, and outlet means for solids fines opening from the upper part of said elutriation chamber.

18. An apparatus according to claim 17 in combination with a separator chamber disposed within said elutriation chamber and surrounding the outlet opening of said conveyance conduit, a transverse thrust plate disposed within said separator chamber immediately adjacent and spaced apart from said outlet opening, an outlet conduit for conveyance fluid opening from said separator chamber and outlet openings for discharging solids from said separator chamber into said elutriation chamber at said intermediate point.

19. An apparatus according to claim 17 in combination with a separator chamber disposed within said elutriator chamber and surrounding the outlet opening of said conveyance conduit, a transverse thrust plate disposed immediately adjacent and spaced apart from said outlet opening of said conveyance conduit, an outlet conduit opening from said separation chamber for conveyance fluid removal, a first outlet means opening from said separator chamber for at least part of said solids therethrough into said elutriation chamber at said intermediate point, a second outlet means opening from the bottom of said separator chamber for the remaining part of said solids, and separate solids flow control means in said first and second outlet means for controlling the rates of removal of solids from said separator and elutriation chambers whereby the proportion of solids discharged from said conveyance conduit and which are elutriated may be controlled.

20. An apparatus according to claim 17 in combination with a pressure resistant vessel surrounding said elutriation chamber, said elutriation chamber having an open upper end, an annular sloping baffle disposed in the annular space between said vessel and said elutriation chamber and adapted to the downward flow of solids fines and to prevent the upward flow of elutriation fluid through said annular space, an outlet conduit for solids fines opening from said annular space above and adjacent the lowest point of said annular baffle, a centrifugal separator disposed above the upper end of said elutriation chamber and within said vessel and adapted to receive disengaged elutriation fluids from said elutriation chamber, and an outlet conduit for separated solids fines communicating the lower part of said separator with said annular space.

References Cited in the file of this patent

UNITED STATES PATENTS

| | | |
|---|---|---|
| 2,014,291 | Reed | Sept. 10, 1935 |
| 2,132,961 | Morgan | Oct. 11, 1938 |
| 2,268,535 | Schutte | Dec. 30, 1941 |
| 2,393,636 | Johnson | Jan. 29, 1946 |
| 2,446,247 | Scheineman | Aug. 3, 1948 |
| 2,459,056 | Watson | Jan. 11, 1949 |
| 2,567,207 | Hoge | Sept. 11, 1951 |
| 2,643,161 | Shirk | June 23, 1953 |
| 2,661,321 | Schutte | Dec. 1, 1953 |

OTHER REFERENCES

Houdriflow, New Design in Catalytic Cracking, Oil and Gas Journal, January 13, 1949, vol. 47, pp. 78 and 79. (Copy in Scientific Library.)